United States Patent Office 2,873,284
Patented Feb. 10, 1959

2,873,284

N,N-DIALKYL ACYLAMIDE SOLVATE OF 1,4-PREGNADIENE-17α,21-DIOL-3,11,20-TRIONE-21-ACYLATE AND PROCESS OF PREPARING SUCH

John T. Day, North Plainfield, Raymond L. Erickson, Plainfield, and Russell H. Pettebone, Fanwood, N. J., assignors to Merck & Co., Inc., Rahway, N. J., a corporation of New Jersey No Drawing. Application August 10, 1955
Serial No. 527,657

9 Claims. (Cl. 260—397.45)

This invention relates to the preparation of 1,4-pregnadiene-17α,21-diol-3,11,20-trione and 1,4-pregnadiene-17α,21-diol-3,11,20-trione-21-acylate. It is also concerned with the N,N-dialkylacylamide solvate of 1,4-pregnadiene-17α,21-diol-3,11,20-trione-21-acylate produced as an intermediate in the synthesis of 1,4-pregnadiene-17α,21-diol-3,11,20-trione and 1,4-pregnadiene-17α,21-diol-3,11, 20-trione-21-acylate.

The 1,4-pregnadiene-17α,21-diol-3,11,20-trione and 1,4-pregnadiene-17α,21-diol-3,11,20-trione-21-acylate with which this invention is concerned possess marked and effective properties in the treatment of arthritic conditions.

One of the chief disadvantages encountered in the clinical use of cortisone and hydrocortisone has been the retention of sodium and water in the body. In contrast with this the retention of sodium and water in the body is markedly reduced, when 1,4-pregnadiene-17α,21-diol-3,11,20 - trione or 1,4 - pregnadiene - 17α,21 - diol - 3,11,20 - trione - 21 - acylate is administered.

In preparing 1,4-pregnadiene-17α,21-diol-3,11,20-trione and 1,4-pregnadiene-17α,21-diol-3,11,20-trione-21-acylate in accordance with the present invention the starting material, having the following structure:

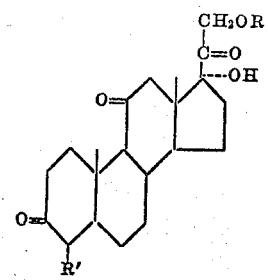

wherein R is acyl and R' is hydrogen or bromine, is reacted with sufficient bromine to form a mixture containing predominantly 2,4-dibromopregnane-17α,21-diol-3,11,20-trione-21-acylate having the formula

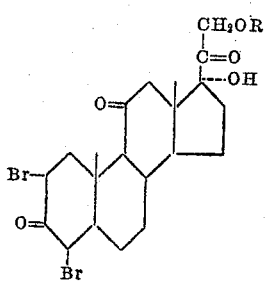

The 2,4 - dibromopregnane-17α,21-diol-3,11,20-trione-21-acylate is treated with an N,N-dialkyl acylamide in the presence of an acid binding agent to form the N,N-dialkyl acylamide solvate of 1,4-pregnadiene-17α,21-diol-3,11,20-trione-21-acylate having the formula

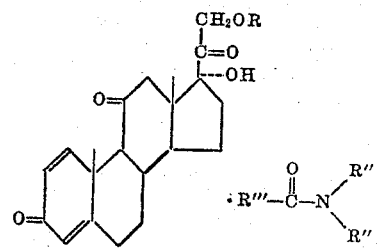

wherein R is acyl, R''' is hydrogen or alkyl and R'' is an alkyl radical.

The N,N-dialkyl acyl amides which are suitable for use in this reaction include dimethylformamide, diethylformamide and dimethylacetamide.

The acid binding agents which may be employed in this reaction include tertiary amines such as dimethylaniline, collidines, lutidines and pyridine, inorganic bases such as calcium carbonate, also other acid binding agents which do not cause degration of the steroid molecule, may be employed. Such compounds as tertiary butanol and semicarbazide are examples.

The N,N-dialkyl acylamide solvent is removed and 1,4-pregnadiene - 17α,21-diol-3,11,20-trione-21-acylate having the following structural formula is recovered

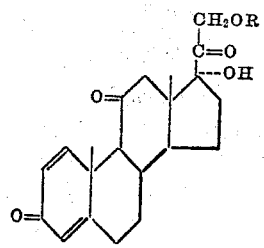

wherein R is acyl as above.

Hydrolysis of 1,4 - pregnadiene - 17α,21 - diol-3,11,20-trione-21-acetate results in the formation of 1,4-pregnadiene-17α,21-diol-3,11,20-trione having the following structural formula

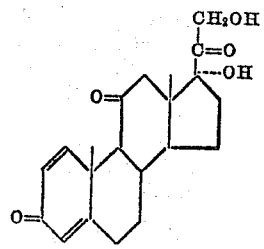

Alternatively the N,N-dialkyl acylamide solvate of 1,4-pregnadiene-17α,21-diol-3,11,20-trione-21-acylate may be hydrolyzed directly to 1,4-pregnadiene-17α,21-diol-3,11,20-trione.

In accordance with one method of carrying out the present invention one mole of pregnane-17α,21-diol-3,11,20-trione-21-acetate is reacted with two moles of bromine in a chloroform-acetic acid system to form a mixture containing predominantly 2,4-dibromopregnane-17α,21-diol-3,11,20-trione-21-acetate.

When 4-bromopregnane-17α,21-diol-3,11,20-trione-21-acetate is employed as the starting material, only one mole of bromine is required to form a crude mixture which is predominately 2,4-dibromopregnane-17α,21-diol-3,11,20-trione-21-acetate.

The 2,4-dibromopregnane-17α,21-diol-3,11,20-trione-21-acetate is reacted with dimethylformamide in the presence of dimethylaniline or s-collidine.

Dehydrohalogenation of the crude brominated product results in the major product 1,4-pregnadiene-17α,21-diol-3,11,20-trione-21-acetate contaminated with cortisone acetate. These two materials have very similar physical properties and thus are extremely difficult to separate; requiring extensive purification procedures such as chromatography and thus result in a low yield of desired 1,4 - pregnadiene - 17α,21 - diol - 3,11,20 - trione - 21-acetate. The use of dimethylformamide in the dehydrohalogenation of the crude 2,4-dibromopregnane-17α,21-diol-3,11,20-trione-21-acetate results in a higher yield of desired product and avoids the use of such extensive purification procedures through the formation of a solvate of the steroid and the dimethylformamide. Although cortisone acetate and the 1,4-pregnadiene-17α,21-ol-3,11,20-trione-21-acetate both form solvates with dimethylformamide, a surprising feature of these products is that they may be easily separated by simple crystallization procedures. Thus formation of the solvate avoids complicated purification techniques and results in increased yield of desired product.

The dimethylformamide solvate of 1,4-pregnadiene-17α,21-diol-3,11,20-trione-21-acetate dissolved in methyl alcohol and then treated with sodium methylate and 1,4-pregnadiene-17α,21-diol-3,11,20-trione is recovered.

Alternatively the dimethylformamide solvate of 1,4-pregnadiene-17α,21-diol-3,11,20-trione-21-acetate can be heated to approximately 115° C. in vacuo to remove the dimethylformamide and the 1,4-pregnadiene-17α,21-diol-3,11,20-trione-21-acetate hydrolyzed to form 1,4-pregnadiene-17α,21-diol-3,11,20-trione.

The following examples are given primarily by way of illustration and not of limitation.

Example 1

40.4 grams (0.10 mole) of pregnane-17α,21-diol-3,11,20-trione-21-acetate was dissolved in 800 cc. of chloroform with 90 cc. glacial acetic acid. The solution was cooled to −5° C. and a catalytic quantity of hydrogen bromide in glacial acetic acid was added. A solution of 0.2 mole of bromine in glacial acetic acid was added with good agitation. Uptake of bromine was practically instantaneous. The hydrogen bromide was neutralized by the addition of sodium acetate in water. The resulting two-phase system was concentrated in vacuo to about 100–150 cc. The 2,4 - dibromopregnane - 17α,21 - diol-3,11,20-trione-21-acetate was completely precipitated by a quantity of 1000 cc. of water, removed by filtration, and then dried to constant weight. $[\alpha]_D^{26°}$ chloroform=+37.5°. Bromine analysis=27.9%.

Twenty grams of the crude dry 2,4-dibromopregnane-17α,21-diol-3,11,20-trione-21-acetate was dissolved in dimethylformamide to which has been added 20 cc. of dimethylaniline. The solution was heated at 135° C. for three and one-half hours. At the end of the heating period, chloroform was added and the dimethylaniline was removed by extraction with dilute hydrochloric acid. The chloroform solution was decolorized with charcoal and concentrated to approximately 20 cc. which resulted in a slurry of crystalline dimethylformamide solvate of 1,4 - pregnadiene - 17α,21 - diol - 3,11,20 - trione - 21-acetate. When the aforementioned solvate was removed by filtration and dried in vacuo at 115° C. desolvation occurred and the 1,4-pregnadiene-17α,21-diol-3,11,20-trione-21-acetate was obtained free of dimethylformamide. The 1,4 - pregnadiene - 17α,21 - diol - 3,11,20-trione-21-acetate thus obtained had a melting point of 234.2–239.2° C., λ maximum methyl alcohol 2390, E% 364.

Forty and five-hundredths grams (0.10 mole) of the crude 1,4 - pregnadiene - 17α,21 - diol - 3,11,20 - trione-21-acetate was dissolved in 2500 ml. of absolute methanol by heating to 45° C. The solution was cooled to 25° C. and 0.1 mole of sodium methylate was added. The reaction was continued at 25±2° C. for seven minutes. At the end of the reaction period the reaction mixture was made acid to litmus indicator by the addition of glacial acetic acid. The solution was concentrated in vacuo, water added and the resulting crystalline 1,4-pregnadiene-17α,21-diol-3,11,20-trione removed by filtration, washed and dried. Melting point 216.8 to 219.8° C. (with decomposition). Recrystallization afforded a substantially pure product having a melting point of 233.6 to 235.4° C.

|  | λ | E% |
|---|---|---|
| Methyl alcohol | 2380 | 429 |
| Sulfuric acid | 2630 | 431 |

λ maximum Nujol mull 3.03, 5.83, 5.78 (sh), 5.90, 6.12, 6.18. A second crop of 1,4-pregnadiene-17α,21-diol-3,11,20-trione obtained by aging the recrystallization mother liquors had a melting point of 232.4 to 235.4° C.

Example 2

One hundred grams (0.207 mole) of 4-bromopregnane-17α,21-diol-3,11,20-trione-21-acetate was added to a mixture of 225-ml. of chloroform and 25-ml. of glacial acetic acid, and the mixture heated to 55° C. The solution was cooled to 25° C. and the catalyst consisting of 20.7 ml. of acetic acid 1.0 N in hydrogen bromide, was added. The bromination solution of 33.1 grams (0.207 mole) of bromine in 200 ml. of glacial acetic acid was added uniformly over a period of thirty minutes with intense agitation. The reaction mixture was aged at 25° C. an additional five minutes after the bromine had been added and then the hydrogen bromide was neutralized by the addition of a solution of 19.6 grams of sodium acetate in 200 ml. of water. The colorless two-phase system was concentrated in vacuo to the point where the temperature began to rise, denoting the absence of chloroform. Water was added to the reaction mixture whereupon crude 2,4 - dibromopregnane - 17α,21 - diol - 3,11,20 - trione-21-acetate separated from solution. The crude product was recovered by filtration and washed acid-free with about six portions of 500 ml. each of water and air-dried 55° C. to constant weight. $[\alpha]_D$ 47.6° C. (1% chloroform); bromine calculated for 28.6%; found 29.3%.

Five grams of the crude dry 2,4-dibromopregnane-17α,21-diol-3,11,20-trione-21-acetate was added to a mixture of 10 ml. of s-collidine and 25 ml. of dimethylformamide. The solution was heated rapidly to reflux temperature (153° C.) and reflux was continued for two hours from the time of addition. Dehydrobromination can be carried out at 135° C. by extending the reaction time three and one-half hours. At the end of the reflux period, the reaction mixture was cooled to 25° C. and added to 40 ml. of chloroform, 10 grams of crushed ice, and 10 ml. of water. A chilled (15° C.) solution of 6.5 ml. of concentrated hydrochloric acid made up to 20 ml. with water was added and the system agitated for fifteen minutes. The phases were allowed to separate and the chloroform layer was separated. The aqueous acid layer was extracted with two portions of 10 ml. each and two portions of 5 ml. each of chloroform. The combined chloroform solution was washed with 10 ml. of 1.0 N hydrochloric acid. The acid layer was back-extracted with two portions of 5 ml. each of chloroform. The combined chloroform solution was washed with 10 ml. of five percent sodium bicarbonate solution and decolorized with charcoal. The decolorized chloroform solution from the two parts was concentrated in vacuo to the point where crystallization of the dimethylformamide solvate of 1,4-pregnadiene-17α,21-diol-3,11,20-trione-21-acetate commenced, and allowed to stand at 0° C. for about four hours to effect complete crystallization. The crystalline solvate was filtered, washed and air-dried. Melting point 160° C. (desolvates) resolidifies, remelts at 210° C. Nitrogen analysis 2.93% (2.96% theory).

The dimethylformamide solvate of 1,4-pregnadiene-17α,21-diol-3,11,20-trione-21-acetate can be heated to remove the dimethylformamide and the 1,4-pregnadiene-17α,21-diol-3,11,20-trione-21-acetate hydrolyzed to 1,4-pregnadiene-17α,21-diol-3,11,20-trione.

Alternatively, the dimethylformamide solvate of 1,4-pregnadiene-17α,21-diol-3,11,20-trione-21-acetate can be hydrolyzed directly to 1,4-pregnadiene-17α,21-diol-3,11,20-trione.

Any departure from the above description which conforms to the present invention is intended to be included within the scope of the claims.

What is claimed is:

1. The dimethylformamide solvate of 1,4-pregnadiene-17α,21-diol-3,11,20-trione-21-acetate.

2. The process which comprises reacting a compound of the formula—

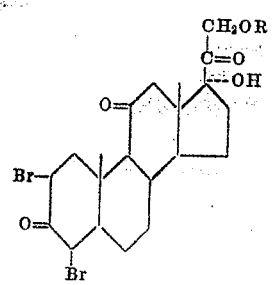

wherein R is lower acyl with an N,N-di-lower alkyl lower acylamide in the presence of an acid binding agent to form a compound of the formula—

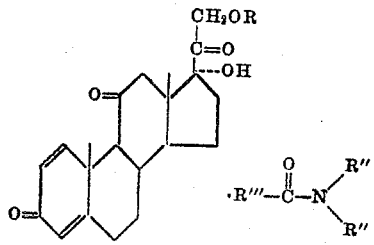

wherein R is as above, R''' is selected from the group consisting of hydrogen and lower alkyl, and R'' is a lower alkyl radical and heating the compound to remove the N,N-di-lower alkyl lower acylamide to form 1,4-pregnadiene-17α,21-diol-3,11,20-trione-21-lower acylate.

3. The process which comprises reacting a compound of the formula—

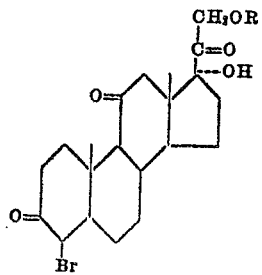

wherein R is lower acyl with bromine to form a compound of the formula—

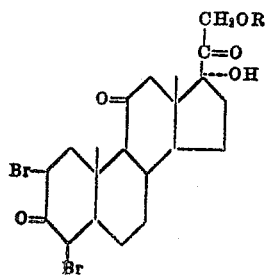

wherein R is as above, reacting the latter compound with an N,N-di-lower alkyl lower acylamide in the presence of an acid binding agent to form a compound of the formula—

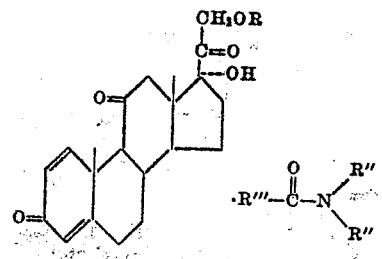

wherein R is as above, R''' is selected from the group consisting of hydrogen and lower alkyl, and R'' is a lower alkyl radical, and heating the compound to remove the N,N-di-lower alkyl lower acylamide to form 1,4-pregnadiene-17α,21-diol-3,11,20-trione-21-lower acylate.

4. The process which comprises reacting 4-bromopregnane-17α,21-diol-3,11,20-trione-21-acetate with bromine to form 2,4-dibromopregnane-17α,21-diol-3,11,20-trione-21-acetate, reacting the latter compound with N,N-di-lower alkyl lower acylamide in the presence of an acid binding agent to form N,N-di-lower alkyl lower acylamide solvate of 1,4-pregnadiene-17α,21-diol-3,11,20-trione-21-acetate, and heating the latter compound to form 1,4-pregnadiene-17α,21-diol-3,11,20-trione-21-acetate.

5. The process which comprises reacting a compound of the formula—

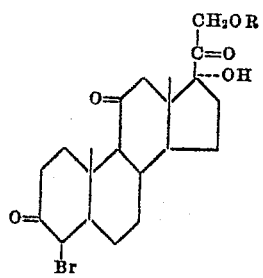

wherein R is lower acyl with bromine to form a compound of the formula—

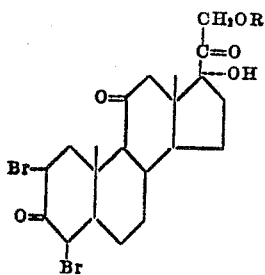

wherein R is as above.

6. The process which comprises reacting a compound of the formula—

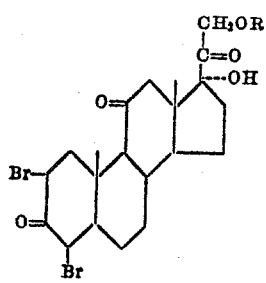

wherein R is lower acyl with an N,N-di-lower alkyl lower acylamide in the presence of an acid binding agent to form a compound of the formula—

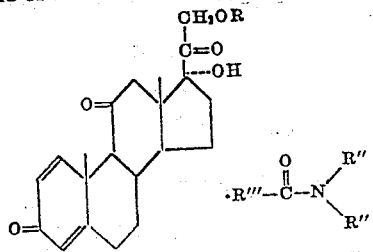

wherein R is as above, R''' is selected from the group consisting of hydrogen and lower alkyl and R'' is a lower alkyl radical.

7. The process which comprises reacting 2,4-di-bromo-pregnane-17α,21-diol-3,11,20-trione-21-acetate with N,N-di-lower alkyl lower acylamide in the presence of an acid binding agent to form N,N-di-lower alkyl lower acylamide solvate of 1,4-pregnadiene-17α,21-diol-3-11,20-trione-21-acetate.

8. The process which comprises reacting 2,4-dibromo-pregnane-17α,21-diol-3,11,20-trione-21-acetate with dimethyl-formamide in the presence of dimethylaniline to form dimethyl-formamide solvate of 1,4-pregnadiene-17α,21-diol-3,11,20-trione-21-acetate.

9. A compound of the formula—

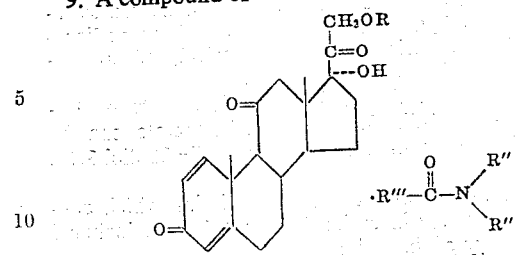

wherein R is lower acyl, R''' is selected from the group consisting of hydrogen and lower alkyl, and R'' is a lower alkyl radical.

References Cited in the file of this patent
UNITED STATES PATENTS 2,703,805   Rosenkranz ............. Mar. 8, 1955
2,735,855   Djerassi ............... Feb. 21, 1956

OTHER REFERENCES

Vischer et al.: Experientia 9, 371–2 (1953).
Vischer et al.: Helv. Chim. Acta 38, 835–40 (May 1955).